United States Patent
Backman

(10) Patent No.: US 9,620,016 B2
(45) Date of Patent: Apr. 11, 2017

(54) MOTOR VEHICLE WITH AN OPTICAL DISPLAY DEVICE FOR A DISTANCE SENSOR

(71) Applicant: GM GLOBAL TECHNOLOGY OPERATIONS LLC, Detroit, MI (US)

(72) Inventor: Fredrik Backman, Frankfurt am Main (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/636,683

(22) Filed: Mar. 3, 2015

(65) Prior Publication Data

US 2015/0254984 A1    Sep. 10, 2015

(30) Foreign Application Priority Data

Mar. 4, 2014 (DE) .................. 10 2014 003 196

(51) Int. Cl.
- *B60Q 1/00* (2006.01)
- *G08G 1/16* (2006.01)
- *B60K 35/00* (2006.01)

(52) U.S. Cl.
CPC ............. *G08G 1/165* (2013.01); *B60K 35/00* (2013.01); *G08G 1/166* (2013.01); *G08G 1/168* (2013.01); *B60K 2350/106* (2013.01); *B60K 2350/1084* (2013.01); *B60K 2350/203* (2013.01)

(58) Field of Classification Search
CPC ......... B60Q 9/006–9/008; B60Q 1/525; B60Q 1/0023; G08G 1/166–1/168; G08G 1/165; G01S 13/93; G01S 13/931; B60K 2350/1084; B60K 35/00

USPC .............................. 340/435, 436, 903, 932.2
See application file for complete search history.

(56) References Cited

U.S. PATENT DOCUMENTS

| | | | |
|---|---|---|---|
| 5,173,881 A | 12/1992 | Sindle | |
| 6,163,253 A | 12/2000 | Yaron et al. | |
| 6,404,328 B1 * | 6/2002 | Alland | G01S 7/411 340/435 |
| 6,433,679 B1 * | 8/2002 | Schmid | B60Q 9/007 340/435 |
| 7,375,621 B1 | 5/2008 | Hines | |
| 7,987,030 B2 | 7/2011 | Flores et al. | |

(Continued)

FOREIGN PATENT DOCUMENTS

| | | |
|---|---|---|
| DE | 102007061723 A1 | 6/2009 |
| DE | 102008064022 A1 | 9/2009 |

(Continued)

OTHER PUBLICATIONS

German Patent Office, German Search Report for Country Application No. 10 2014 003 196.9, dated Nov. 24, 2014.

(Continued)

*Primary Examiner* — Thomas Mullen
(74) *Attorney, Agent, or Firm* — Lorenz & Kopf, LLP.

(57) ABSTRACT

A motor vehicle includes a distance sensor display for registering the distance of the motor vehicle from the surroundings of the motor vehicle, particularly when parking. The distance sensor display includes an optical display device with one or more light-emitting element and a control unit configured to optically display the distance registered by the distance sensor inside the motor vehicle fundamentally in the form of a notional line.

19 Claims, 3 Drawing Sheets

(56) References Cited

U.S. PATENT DOCUMENTS

| | | | |
|---|---|---|---|
| 8,179,240 B1* | 5/2012 | Orefice | G08G 1/161 340/435 |
| 9,035,760 B2 | 5/2015 | Reilhac et al. | |
| 2006/0271261 A1 | 11/2006 | Flores et al. | |
| 2007/0159311 A1* | 7/2007 | Schober | B60Q 1/525 340/435 |
| 2013/0293369 A1* | 11/2013 | Reilhac | B60Q 9/004 340/435 |
| 2014/0002252 A1* | 1/2014 | Fong | B60Q 9/008 340/435 |

FOREIGN PATENT DOCUMENTS

| | | |
|---|---|---|
| DE | 102010033003 A1 | 3/2011 |
| DE | 102009053707 A1 | 5/2011 |
| DE | 102011121392 A1 | 6/2013 |
| EP | 1396381 A1 | 3/2004 |
| FR | 2716145 A1 | 8/1995 |
| FR | 2981626 A1 | 4/2013 |

OTHER PUBLICATIONS

Great Britain Patent Office, Great Britain Search Report for Great Britain Application No. 1503631.2, dated Aug. 10, 2015.

* cited by examiner

MOTOR VEHICLE WITH AN OPTICAL DISPLAY DEVICE FOR A DISTANCE SENSOR

CROSS-REFERENCE TO RELATED APPLICATION

This application claims priority to German Patent Application No. 102014003196.9, filed Mar. 4, 2014, which is incorporated herein by reference in its entirety.

TECHNICAL FIELD

This application pertains to a distance sensor display for a motor vehicle, and more particularly to a distance sensor display having a lighting element arranged inside the motor vehicle fundamentally in the form of a notional line.

BACKGROUND

Motor vehicles are provided with distance sensor display so that the distance of the motor vehicle from its surroundings, particularly from another motor vehicle can be registered using the distance sensor. Distance sensor displays should make maneuvering, e.g. parking the motor vehicle, easier as the distance from its surroundings can thereby be displayed to the driver of the motor vehicle. It is already known that data pertaining to the distance which is registered by the distance sensor is displayable to the driver of the motor vehicle by means of an optical display device.

A system with an optical display device for a motor vehicle is disclosed in U.S. Pat. No. 7,987,030 B2. The distance of the motor vehicle from its surroundings can be registered by means of a distance sensor and the optical display device is built into the steering wheel to optically display the data registered by the distance sensor.

SUMMARY

The present disclosure provides a motor vehicle with an optical display device for a distance sensor with which the distance registered by the distance sensor can be clearly displayed visually with little technical effort. In an embodiment, a motor vehicle includes a car body, a powertrain, a passenger compartment for accommodating at least one occupant which is enclosed by the car body, and a distance sensor for registering the distance of the motor vehicle from the surroundings of the motor vehicle. The distance sensor is preferably configured to register the distance of the motor vehicle from other vehicles during a parking maneuver. An optical display device includes at least one light-emitting lighting element for optically displaying the distance registered by the distance sensor and a control unit with which the optical display device can be enabled subject to the distance which is registered by the distance sensor. The lighting element(s) is arranged fundamentally in the form of a notional line inside the motor vehicle so that, by enabling and/or illuminating the lighting element(s) a band-shaped light source is fundamentally arranged in the form of the notional line. In this manner, the distance which is registered by the distance sensor can be displayed particularly clearly inside the motor vehicle. A band with a narrow width in comparison to its length is considered as a notional line so that the lighting element(s) is arranged band-shaped inside the passenger compartment. If there is only one band-shaped lighting element, this one band-shaped lighting element is designed such that variable longitudinal sections of the lighting element can be enabled and/or illuminated.

The notional line preferably has a radius of curvature of more than 1 m, 3 m, 5 m or 10 m. Even with an infinite radius of curvature, the notional line can be designed as a straight line. However, this one is preferably curved to allow for a better adjustment within the passenger compartment so that there is greater opportunity for customization to the passenger compartment and/or of the arrangements within the passenger compartment.

In a further embodiment, the length of the notional line is longer than 0.2 m, 0.3 m, 0.5 m or 0.7 m such that the minimal straight-line distance between two ends of the notional line is longer than 0.2 m, 0.3 m, 0.5 m or 0.7 m, respectively. The lighting element(s) is arranged exclusively in the form of the notional line inside the motor vehicle such that the notional line is present on the at least one lighting element. When arranged in the form of the notional lines, the notional lighting elements are thereby longer so that when all, or at least the one lighting element are thus enabled and/or illuminated, a fundamentally linear and band-shaped light source of a substantial length, i.e. of more than 0.2 m, 0.3 m, 0.5 m or 0.7 m is present. The distance between individual lighting elements may by very small so that the optical impression of an uninterrupted illuminated band is created. In this way a particularly clear representation of the distance of the motor vehicle from its surroundings can be achieved. Outside of the notional line there are preferably no other lighting elements for the optical display device inside the motor vehicle so that all lighting elements are arranged in the form of a notional line inside the motor vehicle.

In an additional embodiment the motor vehicle includes a number of fundamentally linear and/or band-shaped or punctiform lighting elements, particularly LEDs, arranged in succession in the form of the notional line. The optical display device preferably includes more than 5, 10, 20 or 30 lighting elements. As a result of the large number of lighting elements, a linear or band-shaped lighting source with a variable length can be generated by illuminating or enabling a variable number of lighting elements which may be illuminated in succession, i.e. the larger the number of lighting elements enabled, the longer the length of the fundamentally linear lighting source inside the motor vehicle and vice versa, so that, the notional line on and/or enabled or disabled has a variable length.

In one variant, the length of the notional line on the enable or illuminated lighting element(s) can be operated by the control unit in fundamentally direct proportion to the distance so that the length of the notional line on the enable or illuminated lighting element(s) is greater, the greater the distance is and vice versa. Likewise, the length of the notional line on the disabled or non-illuminated lighting element(s) can be operated by the control unit in fundamentally direct proportion to the distance so that the length of the notional line on the disabled or non-illuminated lighting element(s) is greater, the greater the distance is and vice versa.

Expediently, the length of the notional line on the enabled or illuminated lighting element(s) can be operated by the control unit fundamentally in direct proportion to the distance with a constant of proportionality between 2 and 0.1, in particular between 1 and 0.2. The length of the notional line on the disabled or non-illuminated lighting element can be operated by the control unit fundamentally in direct proportion to the distance with a constant of proportionality between 2 and 0.1, in particular between 1 and 0.2. With a constant of proportionality of 0.5, the lighting element(s) is illuminated by the control unit such that the length of the light source inside the passenger compartment is 0.5 m if, for example, a distance of 1 m is registered by the distance sensor. The length of the band-shaped light source inside the passenger compartment and/or the length of the notional line on the enabled or disabled lighting element(s) is a function of the distance registered by the distance sensor with the constant of proportionality between 2 and 0.1. "Essentially" means that this is feasible with a deviation of less than 30%, 20%, 10% or 5%.

In a further embodiment the optical display device is built into an interior component such as a center console, a door panel or a roof liner of the motor vehicle. The notional line with the lighting element(s) has a long length so that the optical display device can, for example, be built into the center console, the door, or the roof liner. Furthermore, the optical display device can also be built into or integrated into the steering wheel.

In particular, the lighting element(s) is protected by a transparent protective cover to prevent mechanical damage thereto. The transparent protective cover, made for example from a transparent plastic, protects the lighting element(s) from mechanical damage.

In a further embodiment, the lighting element(s), in particular completely and/or all lighting elements, can be operated by the control unit in optical warning mode, e.g. as a flashing light and/or in different colors, if the distance falls below a predefined minimal distance. When a predefined minimal distance, which is registered by the distance sensor, is reached, an optical warning mode occurs, e.g. all of the at least one lighting element is operated as a flashing light and/or is operated in different colors to demonstrate to the driver of the motor vehicle that reducing the distance even further can lead to a collision with the surroundings of the motor vehicle.

In an additional variant the motor vehicle contains an acoustic signaling device and the acoustic signaling device can be operated by the control unit subject to the distance which is registered by the distance sensor. By means of the additional acoustic signaling device the driver can receive an additional warning of a collision with the surroundings of the motor vehicle. In an additional variant, the acoustic signaling device can be operated by the control unit in an acoustic warning mode e.g. an on/off beep tone if the distance falls below a predefined minimal distance.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
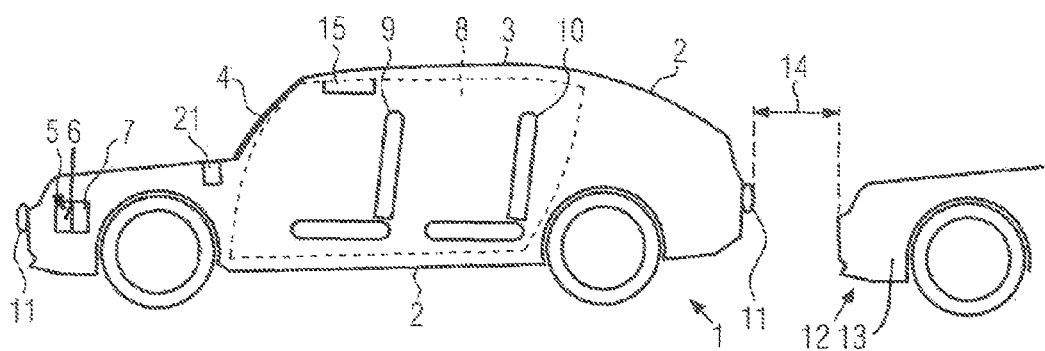
FIG. 1 shows a side view of a motor vehicle with an optical display device.

The following detailed description is merely exemplary in nature and is not intended to limit the present disclosure or the application and uses of the present disclosure. Furthermore, there is no intention to be bound by any theory presented in the preceding background of the present disclosure or the following detailed description.

A motor vehicle 1 features a passenger compartment 8 having two front seats 9 and several back seats 10 arranged inside the passenger compartment 8 to accommodate occupants in the motor vehicle 1. The motor vehicle 1 includes a powertrain 5 having one or more engines, namely a combustion engine 6 and/or an electrical engine 7. The passenger compartment 8 is confined and/or enclosed by a body 2 of the motor vehicle 1. The upper region of the passenger compartment 8 is confined by a roof liner 3. From the passenger compartment 8, the view to the outside in a frontal direction is ensured by a windscreen 4.

The motor vehicle 1 has several distance sensors 11 by means of which the distance 14 of the motor vehicle 1 to its surroundings 12, e.g., to another motor vehicle 13 or a stationary wall can be registered. The data registered by the distance sensors 11 may be acquired by radar or ultrasound or other conventional means, and is fed by data lines, not shown, to a control unit 21, such as an onboard computer of the motor vehicle 1, and is processed in the control unit 21 so that, subject to the data registered by the distance sensors 11 and/or the distance 14, an optical display device 15 can be operated subject to the above. The optical display device 15 has a number of lighting elements 16, designed preferably as LEDs 17 or incandescent lamps, which are arranged band-shaped in succession in the form of a notional line 20 inside the passenger compartment 8 as best seen in FIGS. 2 to 5.

Figure 2:
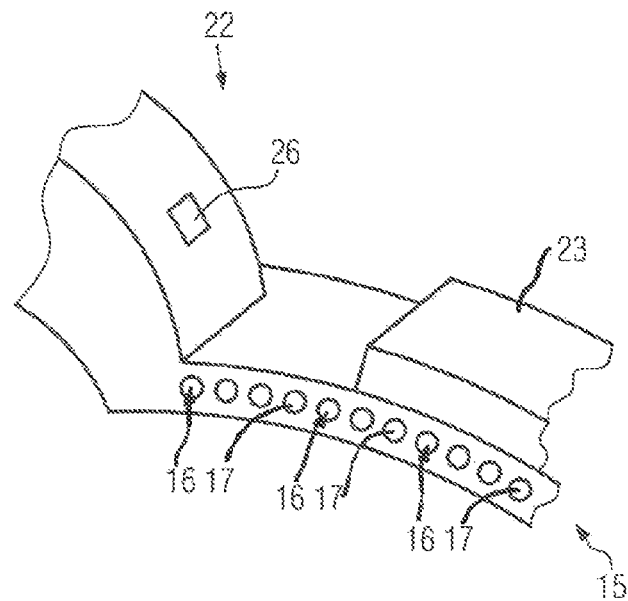
FIG. 2 shows a perspective view of a center console with the optical display device.
Figure 3:
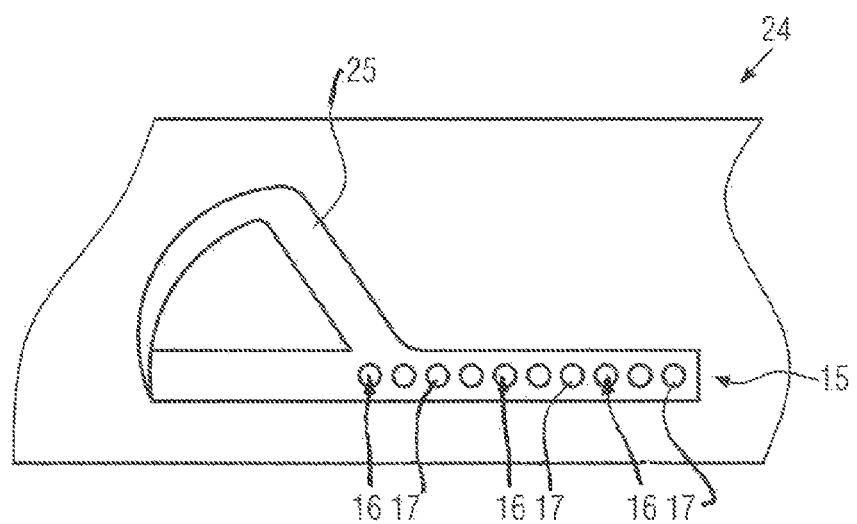
FIG. 3 shows a view of a door with the optical display device.
Figure 4:
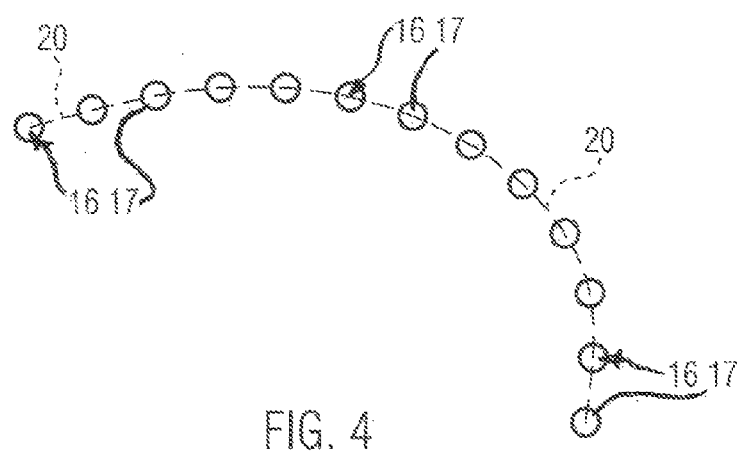
FIG. 4 shows a top view of punctiform lighting elements of the optical display device which are arranged in the form of a notional line.
Figure 5:
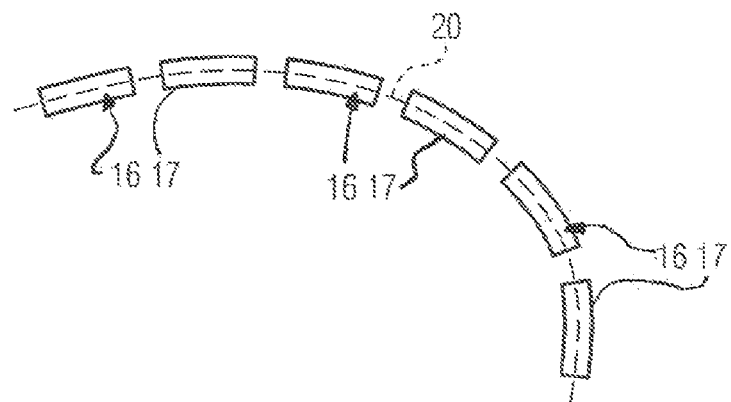
FIG. 5 shows a top view of linear lighting elements of the optical display device which are arranged in the form of the notional line.
Figure 6:
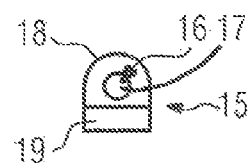
FIG. 6 shows a mounting bar for lighting elements in cross-section.

The individual lighting elements 16 shown in FIG. 4 as LEDs 17 are punctiform and/or spherical. By way of comparison, the individual lighting elements 16 shown in FIG. 5 have a linear (i.e., band-shaped) design. The terms punctiform and linear are not automatically interpreted in the mathematical sense. In other words, it is understood that, in reality, a point has an extension in space and a line has an extension vertical to the line (i.e. a line has a thickness in reality). The lighting elements 16 are attached to a mounting bar 19 and protected from mechanical damage by a translucent protective cover 18. The mounting bar 19 shown in cross-section in FIG. 6 is designed to be curved, and the curvature of the mounting bar 19 corresponds to the curvature of the notional line 20, i.e. a curved longitudinal axis of the mounting bar 19 is parallel to the notional line 20. The lighting elements 16 are arranged in succession in the form of the notional line 20, therefore on the mounting bar 19. The optical display device 15 can, for example, be built into or integrated into the roof liner 3 as seen in FIG. 1, built into or integrated into a center console 22 with an armrest 23 between two front seats 9 of the motor vehicle 1 as seen in FIG. 2, or built into or integrated into a door 24 in the area of a handle 25 as seen in FIG. 3. An additional acoustic signaling device 26 as shown in FIG. 2 is used to provide the driver of the motor vehicle 1 with an additional acoustic warning of a collision and/or if the distance from the surroundings 12 of the motor vehicle 1 is too short.

The lighting elements 16 are enabled i.e. activated by the control unit 21 subject to the distance 14 such that the length of a notional line 20 on enabled (i.e., illuminated) lighting elements 16 is directly proportional to the distance 14 with a constant of proportionality of 0.5. Therefore, if for example the distance sensor 11 registers a distance 14 of 1 m, the lighting elements 16, starting on one end of the entire notional line 20 on all lighting elements 16, are enabled or operated such that the length of the notional partial line 20 on enabled i.e. illuminated lighting elements 16 is 0.5 m in this state. Therefore, in the case of a registered distance 14 of 0.5 m a notional partial line 20 with a length of 0.25 m is enabled as line 20 with illuminated lighting elements 16. The entire length of the notional line 20 with lighting elements 16, when enabled or disabled amounts to 1 m.

Notwithstanding this, the length of the lighting elements 16, which are enabled i.e. illuminated by the control unit 21, is also operated indirectly proportionally to the distance 14, i.e. the shorter the distance 14, the more lighting elements 16 are enabled or illuminated and vice versa. In the latter operational mode, the length of the notional line 20 with disabled lighting elements 16 is therefore, directly proportional to distance 14. By means of the control unit 21 the lighting elements 21 can be operated in both the above-mentioned operating modes by the driver of the motor vehicle 1 selecting an operating mode using a control element (not shown) for the control unit.

If the distance of the motor vehicle 1 from the surroundings 12 of the motor vehicle 1 falls below a predefined minimal distance, e.g. 0.1 m, all lighting elements 16 are operated in an optical warning mode, e.g. as a flashing light, to demonstrate to the driver of the motor vehicle 1 the danger of an imminent contact with the surroundings 12 of the motor vehicle 1. This applies analogously to the acoustic signaling device 21.

Overall, the motor vehicle 1 according to the present disclosure offers considerable advantages. The length of the notional line 20 with enabled or illuminated lighting elements 16 and/or the length of the notional line 20 with disabled or non-illuminated lighting elements 16 shows the driver of the motor vehicle 1 the distance 14 proportionally inside the passenger compartment 8. Therefore, the driver of the motor vehicle 1 can be provided with a particularly clear optical view in a particularly simple fashion of the distance 14 so that the data registered by the distance sensors 11 can be shown particularly clearly inside the passenger compartment 8.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A distance display system for a motor vehicle having a body, a powertrain, and a passenger compartment enclosed by the body for accommodating at least one occupant, the display system comprising:
   at least one distance sensor configured to register a distance of the motor vehicle from an object adjacent the body;
   an optical display device arranged inside the motor vehicle in a roof liner, the optical display device having a plurality of lighting elements arranged in the form of a curved notional line, the optical display device configured to display the distance registered by the distance sensor in a first operating mode and a second operating mode;
   a control unit configured to control the plurality of lighting elements individually in both the first and second operating modes;
   wherein the control unit, in the first operating mode, is configured to illuminate at least one of the plurality of lighting elements such that the optical display device displays the distance registered by the distance sensor as a function of the illuminated length of the notional line; and
   wherein the control unit, in the second operating mode, is configured to disable at least one of the plurality of lighting elements such that the optical display device displays the distance registered by the distance sensor as a function of the disabled length of the notional line.

2. The distance display system according to claim 1 wherein the plurality of lighting elements are arranged in succession along the curved notional line, the plurality of lighting element mounted to a mounting bar, the mounting bar being elongate and having a curvature that corresponds to the curved notional line.

3. The distance display system according to claim 1, wherein the notional line has a radius of curvature in the range of 1 m-10 m.

4. The distance display system according to claim 1, wherein the notional line has a length in the range of 0.2 m-0.7 m.

5. The distance display system according to claim 1 wherein a straight-line distance measured between two ends of the notional line is in a range of 0.2 m-0.7 m.

6. The distance display system according to claim 1 wherein the plurality of lighting elements are arranged in succession to form the notional line.

7. The distance display system according to claim 6 wherein the plurality of lighting elements comprise a plurality of punctiform lighting elements.

8. The distance display system according to claim 6 wherein the plurality of lighting elements comprise a plurality of LEDs.

9. The distance display system according to claim 6 wherein the plurality of lighting elements comprise at least five light emitters forming the notional line.

10. The distance display system according to claim 1, wherein the control unit, in the first operating mode, is configured to illuminate at least one of the plurality of lighting elements according to a constant of proportionality proportion to the distance so that the illuminated length of the notional line corresponds thereto, wherein the constant of proportionality is between 2 and 0.1.

11. The distance display system according to claim 10, wherein the constant of proportionality is between 1 and 0.2.

12. The distance display system according to claim 1, wherein the control unit, in the second operating mode, is configured to disable at least one of the plurality of lighting elements according to a constant of proportionality to the distance so that the disabled length of the notional line corresponds thereto, wherein the constant of proportionality is between 2 and 0.1.

13. The distance display system according to claim 12, wherein the constant of proportionality is between 1 and 0.2.

14. The distance display system according to claim 1 further comprising a transparent protective cover positioned over the plurality of lighting elements to prevent mechanical damage thereto.

15. The distance display system according to claim 1 wherein the control unit is configured to operate the optical display device in an optical warning mode when the distance falls below a predefined minimal distance, wherein the optical warning mode comprises at least one of a flashing light mode and an alternating color mode.

16. The distance display system according to claim 1 further comprising an acoustic signaling device operably coupled to the control unit and configured to emit an acoustic signal as a function of the distance.

17. The distance display system according to claim 16, wherein the control unit is configured to operate the acoustic signaling device in an acoustic warning mode when the distance falls below a predefined minimal distance, wherein the acoustic warning mode is an on-off beep tone.

18. A motor vehicle comprising a body, a powertrain, a passenger compartment enclosed by the body for accommodating at least one occupant and a distance display system according to claim 1.

19. The motor vehicle according to claim 18 wherein the powertrain comprises at least one drive engine selected from the group including a combustion engine and an electrical engine.

* * * * *